3,422,884
CONDENSER TUBE BUNDLES
Philip Seiter Otten, Media, Pa., assignor to Baldwin-Lima-Hamilton Corporation, Philadelphia, Pa., a corporation of Delaware
Filed Dec. 28, 1966, Ser. No. 605,460
U.S. Cl. 165—67
Int. Cl. F28f 9/04
4 Claims

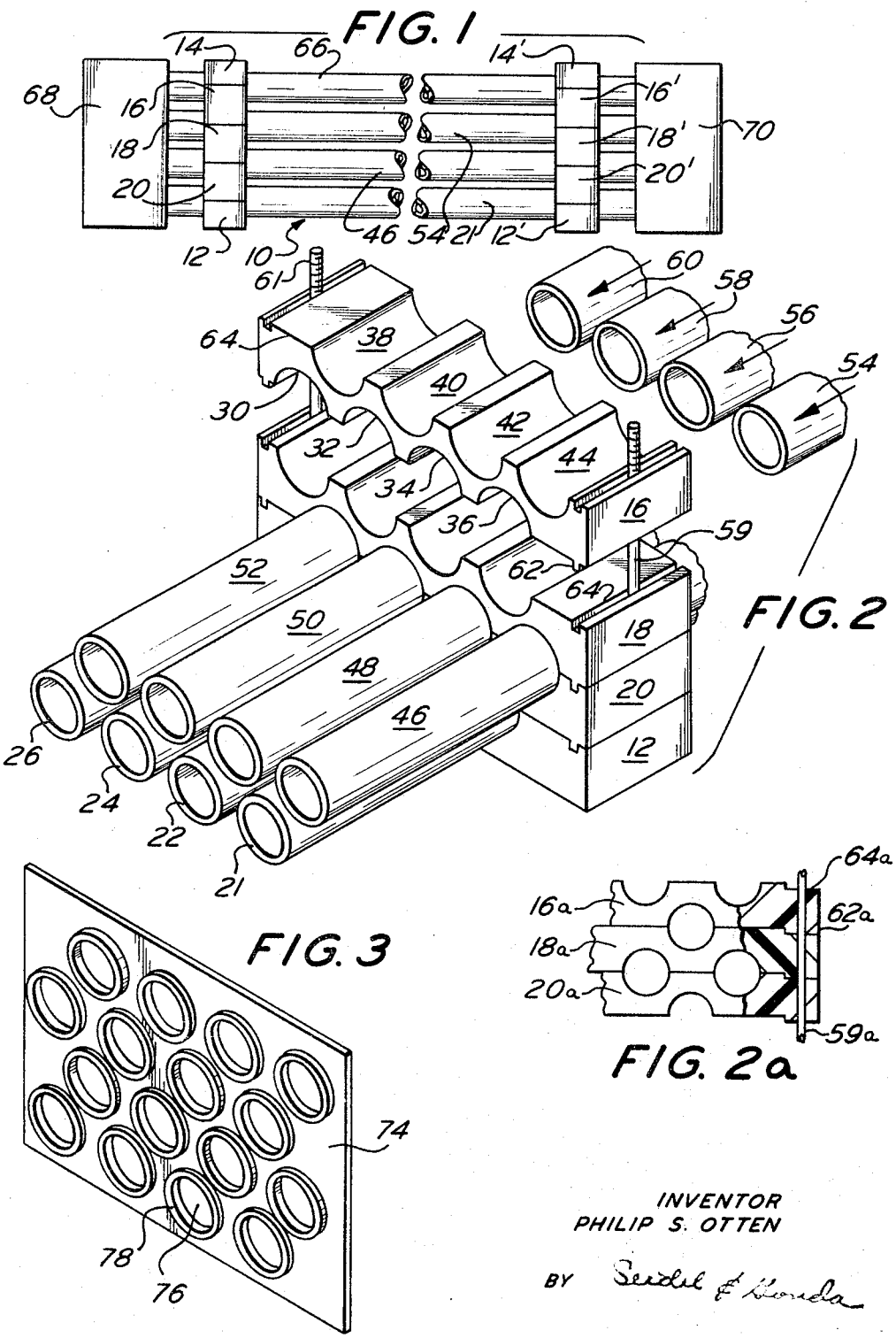

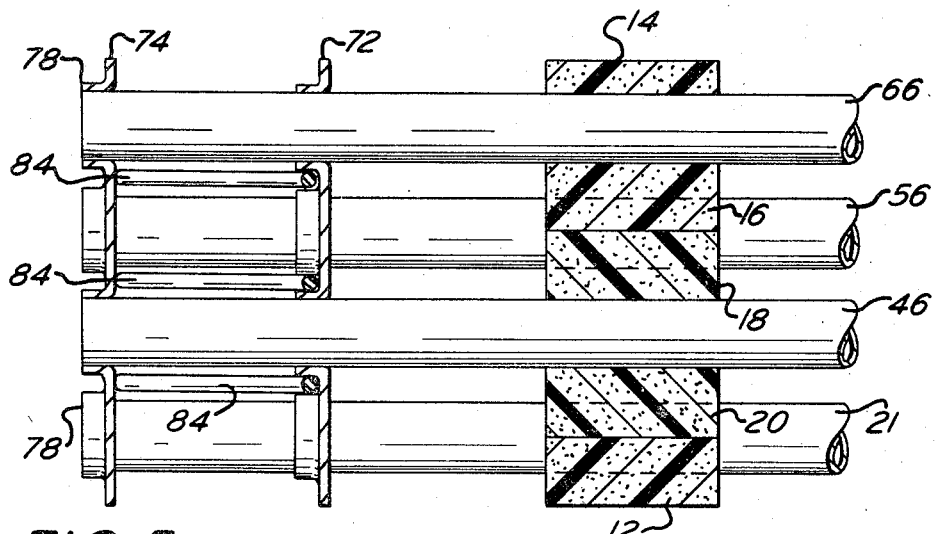
FIG. 4
FIG. 5
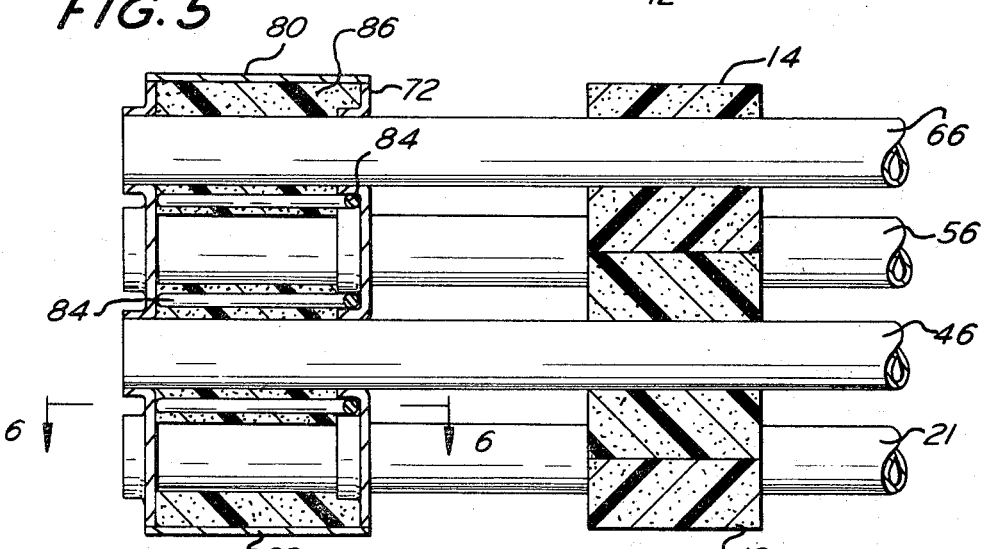
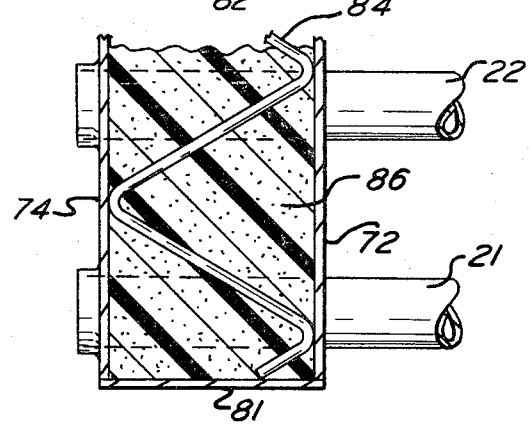
FIG. 6
INVENTOR
PHILIP S. OTTEN
BY Seidel & Gonda
ATTORNEYS United States Patent Office 3,422,884
Patented Jan. 21, 1969

ABSTRACT OF THE DISCLOSURE

Condenser tube bundles for large condensers used in power plants and/or saline water conversion plants are fabricated in a manner which reduces the need for manpower and time for assembly. Rows of tubes are supported by horizontal bars made from lightweight castable material such as foam plastics. After the tubes are coupled together with support bars between horizontal rows of the tubes, a pair of header sheets are telescoped over each end of the tubes. The space between the sheets of each pair may then be filled with foam plastic.

---

This invention relates to condenser tube bundles and the method of manufacturing the same. The method of manufacturing condenser tube bundles utilized heretofore is awkward and time-consuming. Such prior methods involved sliding long tubes one at a time through stationary tube sheets and support plates. Manpower is needed to support each end of the tubes so that the tubes are pushed from one end and pulled at the other end while manpower is utilized to guide the tubes through the support plates and tube sheets.

In accordance with the present invention, condenser tubes are assembled into the proper arrangement before any of the tubes are extended through tube sheets of a header. Thus, the present invention will position all of the tubes simultaneously with respect to the tube sheets rather than one at a time as was done heretofore. In order to position the tubes with respect to each other so that they will be in the proper location for insertion through holes in the tube sheets, lightweight, inexpensive support bars are provided having a series of peripheral grooves on opposite faces. Foam plastic is cast into the space between tube sheets adjacent the ends of the tube bundles. The tube sheets form a wall of a header in which the structural interrelationship of the tubes, tube sheets, and cast material, in accordance with the present invention, provide a lightweight construction at low cost.

It is an object of the present invention to provide a novel tube bundle.

It is another object of the present invention to provide a method for fabricating tube bundles.

It is another object of the present invention to provide novel tube bundles and a method of making the same so that the tube bundles are inexpensive, and light in weight while being capable of being fabricated with minimum manpower and minimum assembly time.

Other objects will appear hereinafter.

For the purpose of illustrating the invention, there are shown in the drawings forms which are presently preferred; it being understood, however, that this invention is not limited to the precise arrangements and instrumentalities shown.

FIGURE 1 is an elevation view of a tube bundle.

FIGURE 2 is a partial perspective view of the tube bundle while being assembled.

FIGURE 2a is a partial elevation view of an alternative interlock for the support bars.

FIGURE 3 is a perspective view of a tube sheet.

FIGURE 4 is a vertical sectional view of the tube bundle.

FIGURE 5 is a view similar to FIGURE 4 but illustrating a subsequent step of manufacture.

FIGURE 6 is a sectional view taken along the line 6—6 in FIGURE 5.

Referring to the drawing in detail wherein like numerals indicate like elements, there is shown in FIGURE 1 a tube bundle designated generally as 10.

The tube bundle 10 includes a bottom support bar 12, a top support bar 14, and intermediate support bars 16, 18 and 20 adjacent one end of the tube bundle. Identical support bars having primed numerals are provided adjacent the other end of the tube bundle. The support bars are made from a lightweight, inexpensive material capable of being molded or cast such as foam plastic. The foam plastic is preferably a closed cell foam polyurethane.

The support bars 12 and 14 are identical. The support bars 16, 18 and 20 are identical. The support bars 12 and 12' are provided with four parallel half-round notches on their upper surface to receive the tubes. A greater or lesser number of notches may be utilized as desired depending upon the number of tubes in each row. The support bars 12 and 12' are supported on a floor or other surface spaced apart by a distance which is less than the length of the tube bundle. The tubes 21, 22, 24 and 26 are positioned so as to be parallel to one another while being partially disposed within the notches on the upper surface of the bars 12 and 12'. Said notches are preferably semi-circular and correspond to the dimensions of the tubes.

Thereafter, support bars 20 and 20' having notches on opposite faces are positioned so that the notches on their lower faces each receive one of the tubes 21–26. The nature and location of the notches on bars 20 and 20' are best illustrated by referring to bar 16 which is identical with bars 20 and 20'. Bar 16 is provided with semicircular notches 30, 32, 34 and 36 on its lower surface offset with respect to notches 38, 40, 42 and 44 on its upper surface.

After the bars 20 and 20' have been positioned so that the notches on their lower surface embrace the tubes 21, 22, 24 and 26, another set of tubes are placed thereover. Thus, tubes 46, 48, 50 and 52 are positioned so as to be supported each within one of the notches on the upper surface of the support bars 20 and 20'. Thereafter, support bar 18 is superimposed over the support bars 12 and 20. A similar support bar 18' is superimposed over the support bars 12' and 20' adjacent the other end of the tube bundle. Each of the tubes 46, 48, 50 and 52 are received within one of the notches on the lower surfaces of the bars 18 and 18'.

Thereafter, the tubes 54, 56, 58 and 60 are positioned so that they are each received within one of the notches on the upper surfaces of the support bars 18 and 18'. Thereafter, the support bar 16 is superimposed over the support bar 18 and support bar 16' is superimposed over support bar 18'. A tube 66 is received within groove 44 and supported adjacent its ends by the support bars 16 and 16'. Other tubes, not shown, are supported by the notches 38–42.

Thereafter, the top support bars 14 and 14' are placed in position. All of the support bars may be interconnected by bolts 59 and 61 which extend through aligned holes in the various support bars. Also, for purposes of orientation the lower surface of the support bars, excluding bar 12 or bar 12', may be provided with a depending rib 62 adapted to be received within a groove 64 on the upper surface of the bar therebelow. A mating rib and groove may be provided adjacent each end of the support bars if desired. In FIGURE 2a there is shown an alternative interlock for the bars wherein bars 16a, 18a, and 20a have their ribs 62a and grooves 64a at their ends. The bolt 59a extends through aligned holes in the grooves.

The thusly assembled tube bundle may be positioned on a support table or the like and is an integrated unit for purposes of transportation to a suitable assembly area if desired.

The ends of the various tubes described above terminate in hollow headers 68 and 70. The headers 68 and 70 are identical. Hence, only header 68 will be described in detail. The header 68 is connected to the tubes by means of a wall having spaced parallel tube sheets 72 and 74. The tube sheets 72 and 74 are similar and include punched holes 76 peripherally defined by axially extending bosses 78. The position of the holes 76 corresponds to the position of the respective tubes as supported by the bars and described above. Tube sheet 72 is positioned so that it telescopes over the ends of the tubes as shown more clearly in FIGURE 4. Before assembling the tube sheet 74, corrugated spring wires 84 may be positioned between some rows of tubes between the tube sheets 72 and 74 to maintain them in spaced relationship. Tube sheet 74 is likewise telescoped over the ends of the tubes with the ends of the tubes being coextensive with the ends of the bosses 78. If desired, the bosses 78 may be welded to the ends of the tubes.

Sheet metal walls 80, 81 and 82 may be provided to interconnect the peripheral surfaces of the tube sheets 72 and 74. Thereafter, a foam plastic filler 86 is cast into place to fill up the space surrounding the tubes and between the sheets 72, 74, 80, 81 and 82. The filler 86 may be a closed cell foam plastic as described above. Filler 86 bonds to the sheets as described as well as to the tubes and the corrugated wires 84.

Foam plastic generally weighs between 2 to 6 pounds per cubic foot. In this manner, the entire sheet bundle may be given stability by providing a thick tube sheet wall for the headers. The entire tube bundle is lightweight and can be manufactured much faster than the old system wherein the tubes are individually inserted through the aligned holes in the tube sheets to thereby form a tube bundle.

The tube sheets 72 and 74 may be of the same material or of different materials. Thus, it is often desirable to have the inner tube sheet 72 of steel and the outer tube sheet 74 of a copper-nickel alloy. The holes 76 and the surrounding bosses 78 in the tube sheets 72 and 74 may be made in conventional stamping procedure which involves first punching and then drawing. The plastic filler 86 provides a hermetic seal between the tube sheets 72 and 74 and thereby renders welding of the ends of the tubes to the tube sheets 74 optional.

The present invention may be embodied in other specific forms without departing from the spirit or essential attributes thereof and, accordingly, reference should be made to the appended claims, rather than to the foregoing specification as indicating the scope of the invention.

It is claimed:

1. A condenser tube bundle comprising horizontal rows of tubes aligned in a repetitive pattern, support bars between adjacent horizontal rows of tubes, each support bar having a plurality of notches, each notch partially receiving a tube in a row thereabove, the support bars being disposed one above the other, means coupling the support bars together to maintain the tubes in a predetermined orientation, a pair of spaced parallel tube sheets telescoped over each of the ends of the tubes, said tube sheets having holes extending therethrough in an arrangement so as to correspond to the orientation of said tubes, a spacer extending between the tube sheets to maintain said tube sheets in spaced parallel orientation, and a filler disposed in the space between the tubes sheets and surrounding a portion of the tubes disposed between the tube sheets.

2. A tube bundle in accordance with claim 1, wherein said filler is a closed cell polymeric plastic and said coupling means includes a rod extending through an aligned opening in said support bars.

3. A tube bundle in accordance with claim 1 wherein said support bars have mating tongue and groove interconnecting means for insuring proper orientation of said support bars.

4. A tube bundle in accordance with claim 1 wherein said filler is a closed cell polymeric plastic, said support bars having mating tongue and groove interconnecting means for insuring proper orientation of said support bars, and said coupling means including a rod extending through an aligned opening in said support bars.

References Cited

UNITED STATES PATENTS

| | | | |
|---|---|---|---|
| 2,176,406 | 10/1939 | McCullough | 165—172 |
| 2,859,948 | 11/1958 | Callard | 165—81 X |
| 3,186,924 | 6/1965 | Williamson | 202—173 |
| 3,324,941 | 6/1967 | Divers | 165—178 XR |
| 3,332,479 | 7/1967 | Martin | 165—178 XR |

FOREIGN PATENTS

| | | |
|---|---|---|
| 512,633 | 9/1939 | Great Britain. |
| 731,431 | 6/1955 | Great Britain. |
| 1,040,284 | 8/1966 | Great Britain. |

ROBERT A. O'LEARY, *Primary Examiner.*

MANUEL A. ANTONAKAS, *Assistant Examiner.*

U.S. Cl. X.R.

165—79, 178